D. G. Gay,

Head Block.

No. 108,250. Patented Oct. 11, 1870.

Witnesses:
A. Benzenendorf
L. S. Maber

Inventor:
D. G. Gay
per Munn & Co.
Attorneys.

United States Patent Office.

DAVID G. GAY, OF EUGENE CITY, OREGON.

Letters Patent No. 108,250, dated October 11, 1870.

IMPROVEMENT IN SAW-MILLS.

The Schedule referred to in these Letters Patent and making part of the same.

*To all whom it may concern:*

Be it known that I, DAVID G. GAY, of Eugene City, in the county of Lane and State of Oregon, have invented a new and useful Improvement in Saw-Mills; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
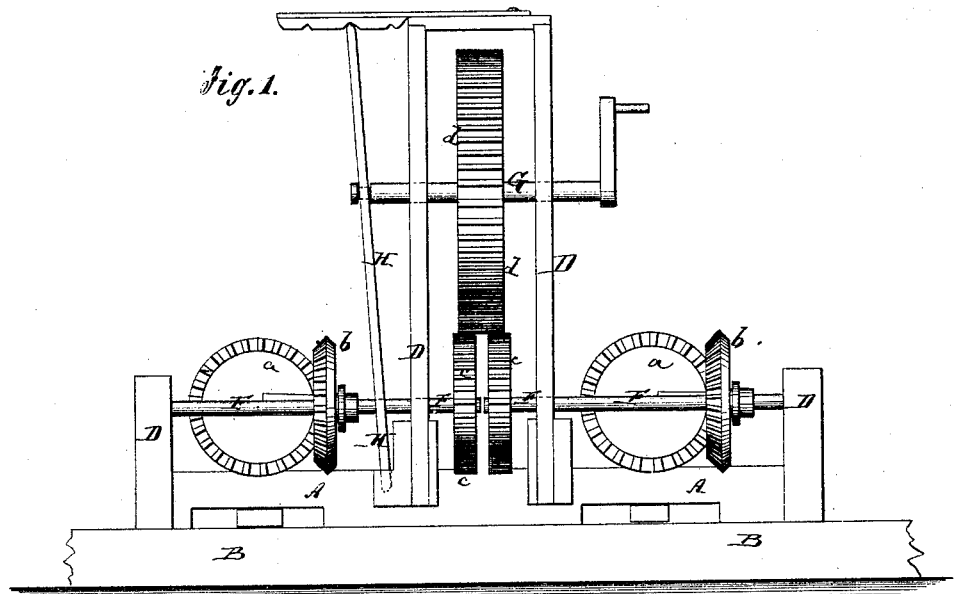
Figure 1 represents a side elevation of my improvement in saw-mills.
Figure 2:
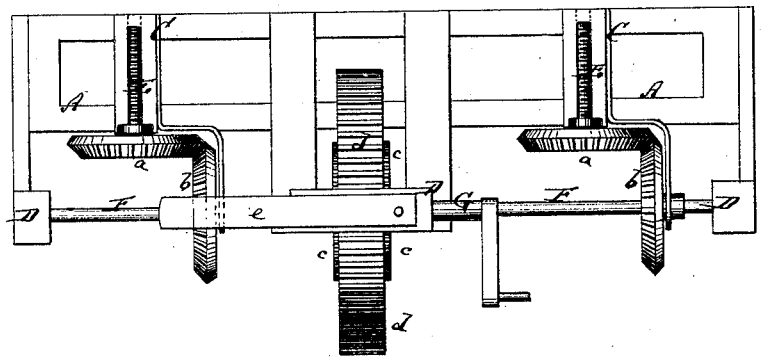
Figure 2 is a plan view of the same.

The object of this invention is to construct a new device for setting logs on the head-blocks of saw-mills.

I will first describe my invention, in connection with all that is necessary to a full understanding thereof, and then clearly point it out in the claim.

A in the drawing represents the carriage of the saw-mill, resting on the floor B of the mill, and supporting the head-blocks C, and a frame, D.

In each head-block is hung a screw, E, which, when turned, will impart the desired longitudinal motion to the log on the head-block.

Each screw carries a toothed wheel, $a$, at its rear end.

In the frame D are hung two horizontal shafts F F, in line with each other, but not in direct connection, as shown in fig. 1.

Each shaft F carries a bevel gear-wheel, $b$, meshing into one of the wheels $a$.

At the ends, where the shafts F nearly meet, they both carry toothed wheels $c$ $c$, of equal diameters.

In the upper part of the frame A is supported a horizontal shaft, G, which carries a large toothed wheel, $d$.

This wheel $d$ meshes at once into both wheels $c$, and imparts motion to both screws E.

The shaft G is secured to a pivoted lever, H, which can be carried to the right or left, so as to swing the wheel $d$ clear of either one of the wheels $c$. The motion can thereby be imparted to either one of the screws, to move either end of the log on the carriage.

A spring catch, $e$, serves to lock the lever H in either position.

Motion is imparted to the wheel $d$ by suitable mechanism.

Having thus described my invention,

I claim as new and desire to secure by Letters Patent—

The adjustable wheel $d$, combined with two shafts F F, which connect with the head-blocks, substantially as herein shown and described, all constructed and arranged to operate as set forth.

DAVID G. GAY.

Witnesses:
JAS. W. SKUGGS,
J. J. WATSON, Jr.